Nov. 16, 1943.   R. B. REEVES   2,334,509
APPARATUS FOR MOLDING OR LINING HOLLOW ARTICLES
Filed Oct. 20, 1941   4 Sheets-Sheet 1

Inventor,
R. B. Reeves
By: Glascock Downing & Seebold
Attys.

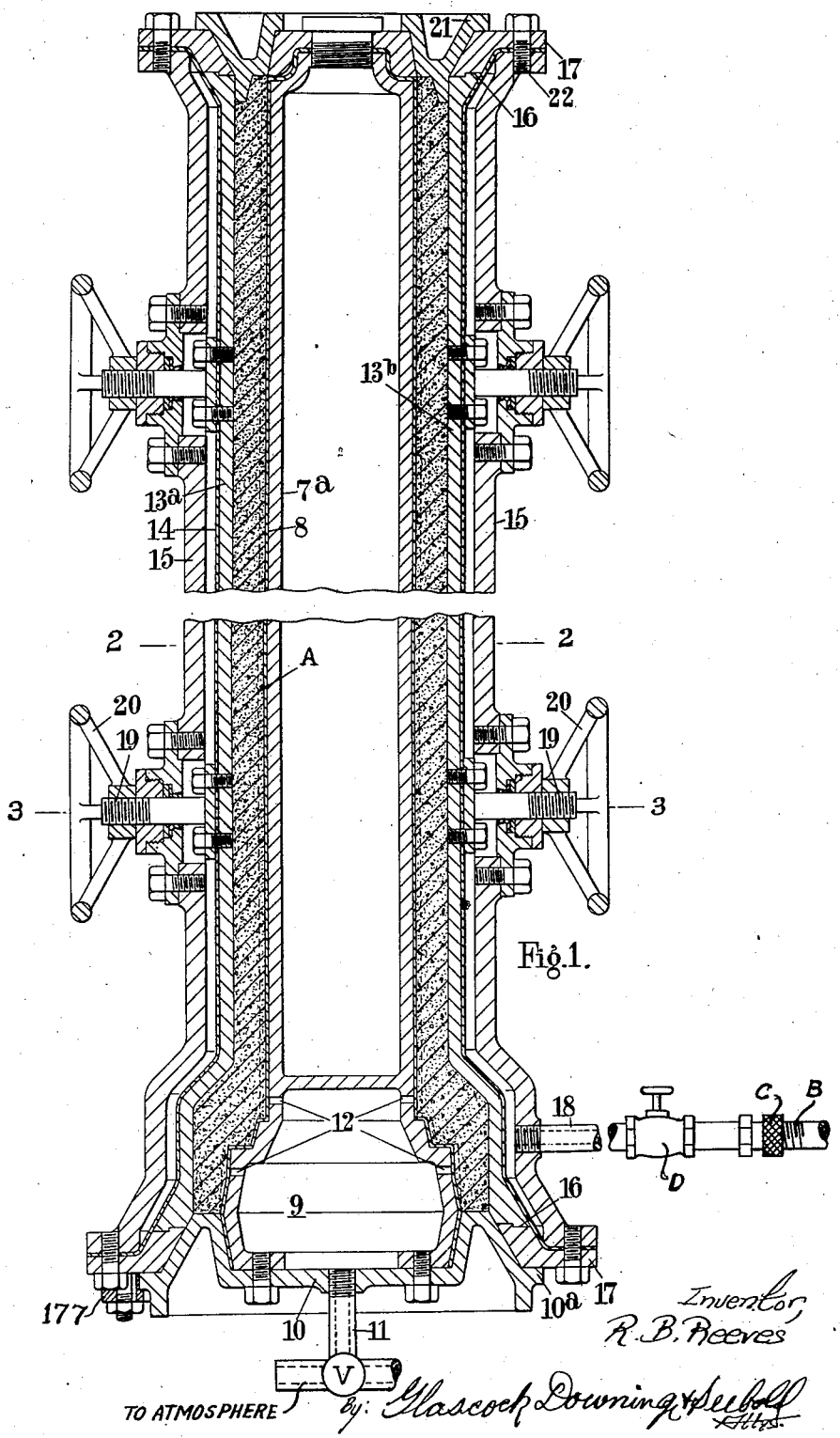

Nov. 16, 1943.   R. B. REEVES   2,334,509
APPARATUS FOR MOLDING OR LINING HOLLOW ARTICLES
Filed Oct. 20, 1941   4 Sheets-Sheet 3
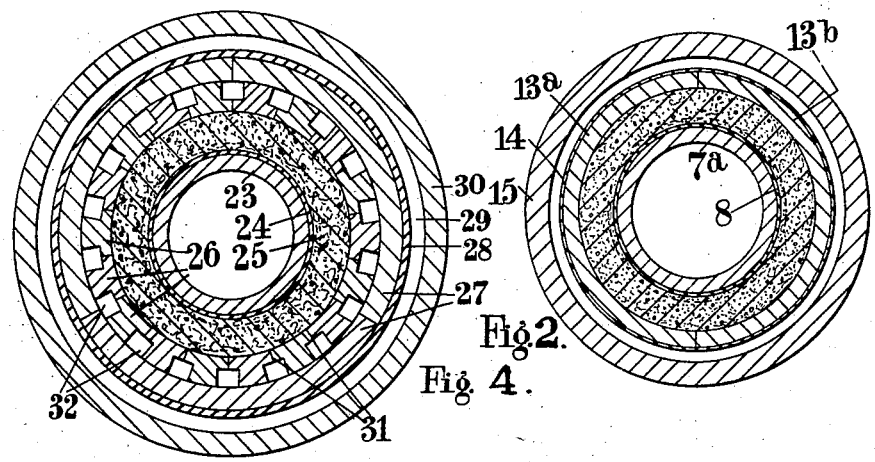
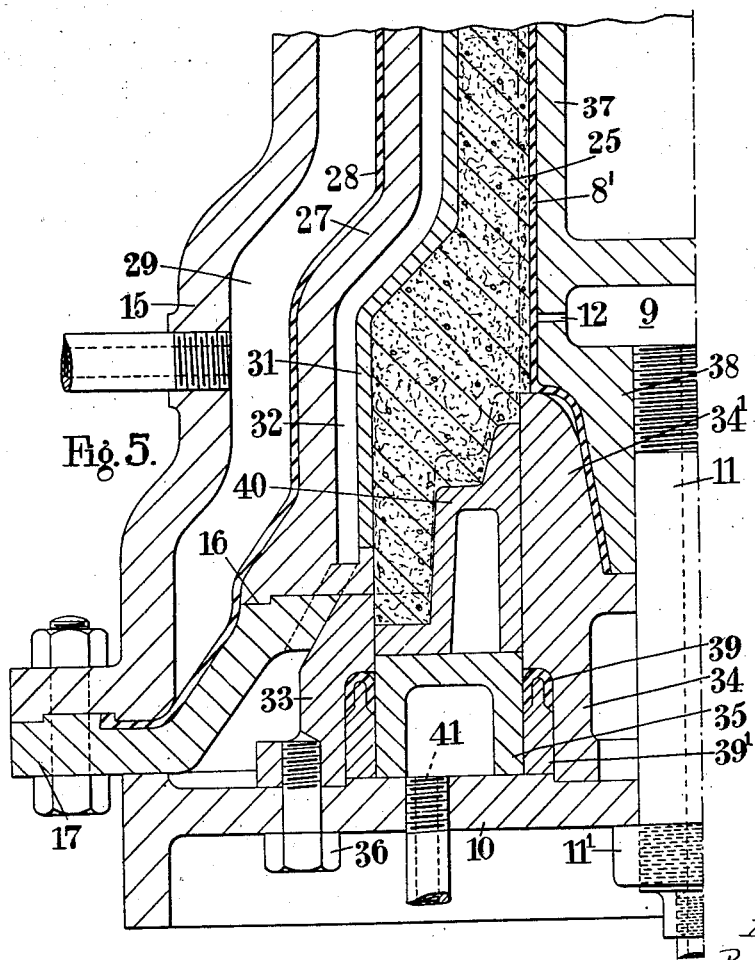

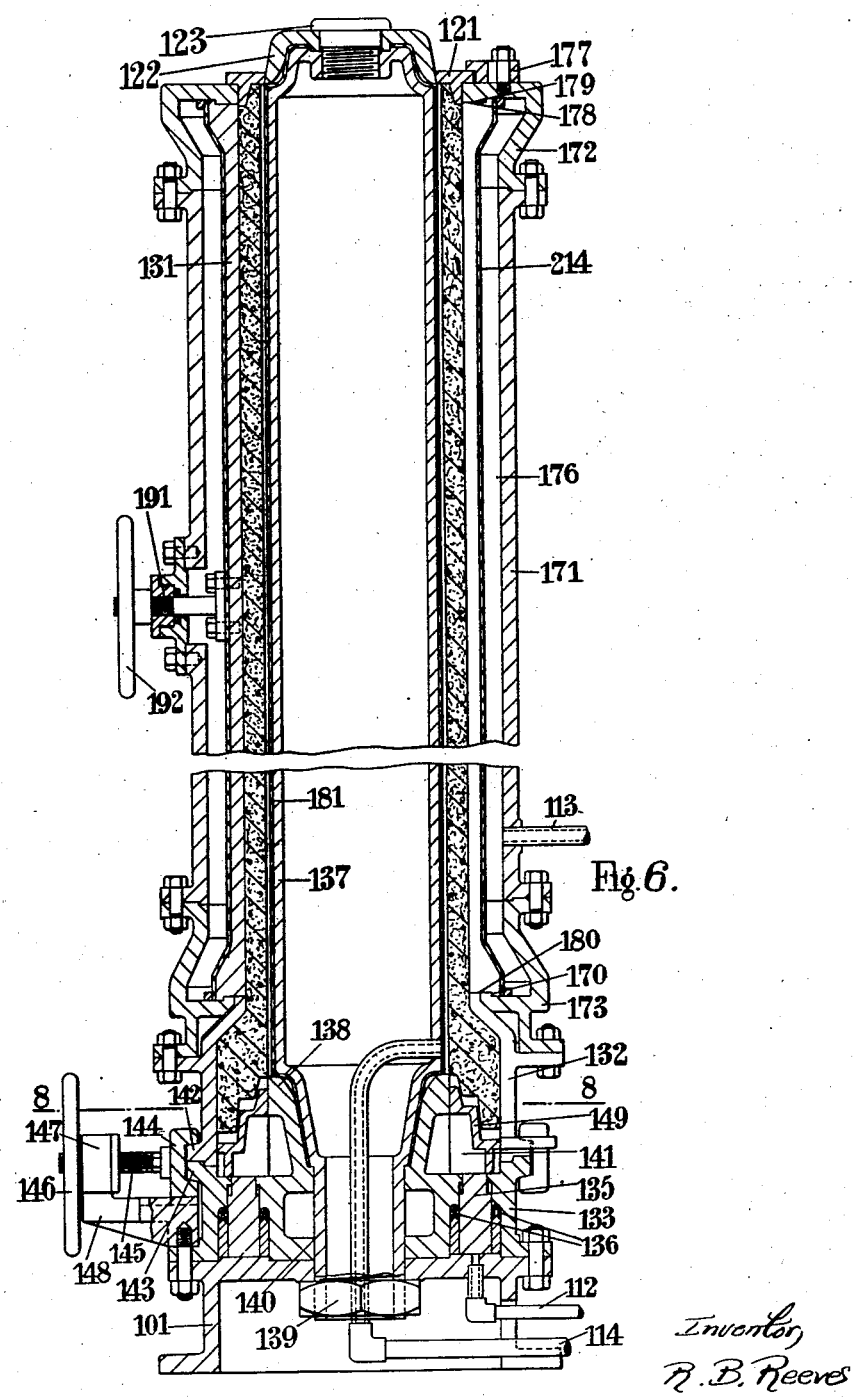

Patented Nov. 16, 1943

2,334,509

UNITED STATES PATENT OFFICE 2,334,509

APPARATUS FOR MOLDING OR LINING HOLLOW ARTICLES

Robert Bruce Reeves, Chelmsford, England

Application October 20, 1941, Serial No. 415,802
In Great Britain October 26, 1940

7 Claims. (Cl. 25—30)

This invention relates to apparatus for manufacturing hollow articles, for example pipes and ducts, from plastic materials, for example concrete, or lining hollow bodies, with such materials, of the type comprising a core having an extensible covering sleeve which is forced away from the core during the molding by means of fluid under pressure admitted between the core and the covering sleeve, so as to compress the plastic material in the mold or the article to be lined.

One object of the invention is to provide a simple and efficient apparatus whereby articles are produced which have very dense and strong walls, and linings are formed which are very firmly pressed against their supports.

Another object of the invention is to expedite the molding of the hollow articles and reduce the time during which the molded articles remain in the mold.

A further object of the invention is to facilitate the removal of the molded articles from the mold.

With these objects in view, the invention consists in the provision of an outer casing having a mold therein, comprising a plurality of longitudinal sections, said outer casing having guide rings thereon for preventing movement of the mold sections relatively to the outer casing in the axial direction but permitting movement of the mold sections in the radial direction, to enable the mold sections to be detached from the molded article after the molding has been completed, the core being provided on a base which supports the outer casing and the mold during the molding and the arrangement being such that the outer casing, together with the mold containing the molded article, can be removed from said base after relaxation of the fluid pressure between the core and the covering sleeve. By this means, the molded article can be transferred to a separate support, and the mold casing containing the mold can then be returned to the base for the production of another molded article, after detachment and removal of the mold from the molded article.

Where the apparatus is used for the provision of a lining in a hollow article, the latter is placed in the mold and the lining is formed between the hollow article and the core having the extensible covering sleeve.

Any desired plastic material may be used. Moreover, any form of reinforcement may be used in connection with the plastic material, for the purpose of obtaining additional strength, e. g., in the case of articles made of concrete, metal rods or expanded metal may be embedded in the concrete. Also, any suitable extensible material, e. g., rubber, may be used for the extensible covering.

Three embodiments of the apparatus according to the invention are illustrated by way of example in the accompanying drawings.

Figure 1 is a vertical section through one form of the apparatus on the line 1—1 of Figure 3.

Figures 2 and 3 are transverse sections on the lines 2—2 and 3—3 respectively of Figure 1.

Figure 4 is a transverse section through another form of the apparatus.

Figure 5 is a part vertical section through a further modification.

Figure 6 is a part vertical section on the line 6—6 of Figure 7 of another modification.

Figure 3:
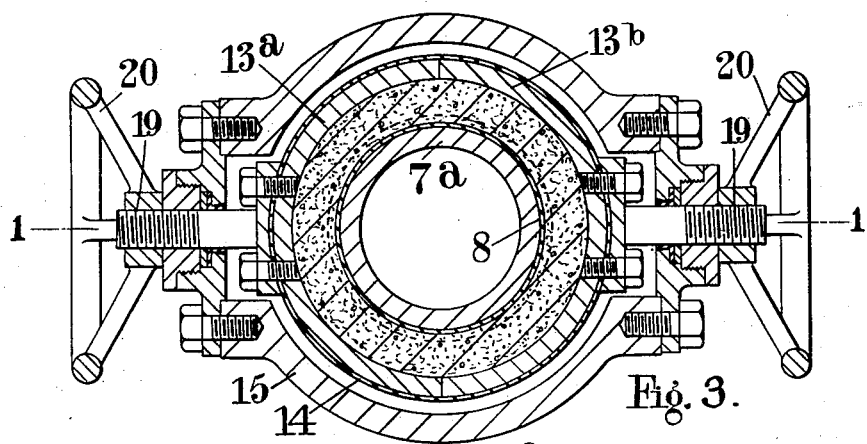

In the embodiment of the invention illustrated in Figures 1-3, for the purpose of making concrete pipes or ducts, use is made of a cylindrical core 7a surrounded by a sleeve 8 of extensible material, such as rubber. The lower end of the core is formed as a pressure chamber 9, and is secured to a flanged base 10 having an inlet pipe 11 through which fluid under pressure may be admitted to the interior of the end 9 of the core under the control of a valve V. The core has openings 12 through which the fluid has access to the interior of the sleeve 8.

The mold is cylindrical and is divided longitudinally into two sections 13a, 13b, which are surrounded by an extensible sleeve 14 which fits tightly round them and holds them in position. The mold sections are supported in an outer casing 15, the lower end of which is supported on and detachably secured by dogs 17T to the flange 10a of the base 10. The mold sections are held between faces 16 on rings 17 secured to the ends of the casing 15, so as to be capable of sliding in the radial direction thereon, while not being free to move in the axial direction. A pipe 18 which is connected up by a quick release coupling C to a flexible hose B enables fluid under pressure to be admitted under the control of a valve D through the said hose from a source of fluid pressure to the space between the outer casing 15 and the extensible sleeve 14, for the purpose of pressing the mold sections 13a, 13b together and enabling the mold to resist internal pressure. The arrangement employed for controlling the flow through the pipe 18 consists of a valve D and a quick-release coupling C for enabling the pipe 18 to be disconnected from the flexible hose B connected to the source of pressure fluid, for facilitating the removal of the mold casing and mold from the base 10. The valve D serves for maintaining the pressure in the space a, after the coupling C has been undone, until the mold has been transferred to the support upon which the molded article is left to harden, the said valve being closed before the coupling is undone.

The mold sections 13a, 13b are further attached to threaded rods 19 passing through the outer casing 15 and coacting with hand-wheels 20, for the purpose of displacing the mold sections in the radial direction. A sealing plate 21 is provided to close the space between the core and the mold at the upper end and is suitably shaped to mold the end of the pipe and is removably secured by dogs 177. The outer surface of the lower end of the core is made of a suitable shape for forming a socket at the end of the pipe in conjunction with the lower end of the mold which is suitably shaped for molding the outside of the pipe.

The apparatus is used in the following manner: the space between the sleeve 8 and the mold sections 13a, 13b is filled with concrete from the top, and the whole is vibrated to render the density of the concrete filling uniform. Then the sealing plate 21 is placed in position and secured by means of the dogs 177. Fluid under pressure is admitted to the space between the outer casing 15 and the sleeve 14 by operating the valve D, before or after filling with concrete, as required, so as to hold the mold sections 13a, 13b together and enable them to resist internal pressure. Fluid under pressure is also admitted through the valve V and the inlet pipe 11 in the base and passes through the openings 12 in the end 9 of the core 7a, so as to force the extensible sleeve 8 away from the core 7a, thereby compressing the concrete against the mold sections 13a, 13b and ensuring the formation of a very dense wall.

When the molding is completed, the pressure is released from the interior of the core by actuating the valve V to place the pipe 11 in communication with the atmosphere, allowing the extensible sleeve 8 to spring back against the outer surface of the core 7a, leaving a gap between the concrete pipe and the sleeve 8. The sealing plate 21 is then removed. The casing 15 is then detached from the flange 10a and, with the mold sections 13a, 13b and the pipe inside, is lifted from the core 7a and base 10 and placed on a support which fits into the lower end of the pipe, the pipe sticking to the mold sections.

The pressure between the extensible sleeve 14 surrounding the mold sections 13a, 13b and the outer casing 15 is then released by operating the valve D and the mold sections are drawn away from the pipe in the radial direction, sliding between the faces of the guide rings 17 against the pressure of the extensible sleeve, by rotating the hand-wheels 20 and thereby moving the threaded rods 19 outwardly, which are bolted to the mold sections 13a, 13b. By this means it is possible to strip the mold from the pipe immediately after the molding without waiting for the pipe to set and harden. The casing 15 together with the mold sections is then lifted off the pipe, and, after cleaning, the mold sections can be restored to the original shape by rotating the hand-wheels 20 in the reverse direction, whereupon the elasticity of the sleeve 14 draws the mold sections together again. Finally the mold is again placed over the core 7a, and secured to the flange 10a on the base 10, and is then ready for use again. The hand wheels 20 are constructed as nuts and rotate on the rods 19, and do not themselves act to force the mold sections inwardly.

Figure 4 shows a construction by means of which air and water can be extracted from the plastic material while it is being compressed. In this construction, use is made of a cylindrical core 23 surrounded by an extensible sleeve 24. The plastic material 25 is introduced between the sleeve 24 and an inner mold which is divided longitudinally into a number of segments 26. This inner mold is surrounded by an outer mold divided into three segments 27, which are held together by an extensible sleeve 28. There is a space 29 between the sleeve 28 and the outer casing 30. The outer mold segments 27 are displaceable by means of hand-wheels and screws as in the construction shown in Figure 1.

The inner segments 26 fit against the outer segments 27 so that when the latter are forced together by hydraulic pressure applied in the space 29, the inner segments are also forced together, forming joints 31 between them which are good enough to retain the plastic material while allowing air and water to escape into the cavities 32. When pressure is applied inside the sleeve 24, the plastic material is compressed and any water it may contain is forced out through the joints 31 into the cavities 32. It runs down these cavities, which extend over the whole length of the mold, and leaves the mold at the bottom end. In other respects the construction and operation of this apparatus is similar to that described with reference to Figures 1–3.

Referring to the form shown in Figure 5, in order to enable a simpler shape of core sleeve to be employed, the core sleeve 8', instead of extending down the outside of the part of the core which shapes the socket, as shown in Figure 2, is offset inwardly at its lower end 38 where it is gripped between the lower conical end of the upper part of the core tube 37 which is provided with a pressure chamber 9 and the conical internal recess 34' of the lower part 34 of the core, the two parts of the core being clamped together and to the base 10 by means of the inlet pipe 11 and the nut 11', the upper end of the pipe 11 being screwed into the lower end 38 of the part 37 of the core. An annular piston 35 encircles the lower end of the part 34 of the core, the periphery of the said piston being a sliding fit inside an open ended cylinder 33 which is secured to the base 10 by means of screws 36. U-leather packings 39 accommodated in recesses in the core part 34 and the cylinder 33, respectively, serve for sealing the piston 35. Fluid under pressure is supplied to the cylinder 33 below the piston 35 through a passage 41 to enable the piston to be raised to compress the socket portion of the pipe by means of a follower 40 which rests on the piston. The U-leather packings are held in position by means of supporting members 39'.

The apparatus shown in Figure 5 is used in the same manner as that shown in Figures 1 and 4, except that in addition to admitting fluid under pressure through the pipe 11, between the casing 15 and the sleeve 14 and to the space 29, fluid under pressure is also admitted below the piston 35 to compress the socket part of the pipe on the inside by means of the follower 40.

Figure 7:
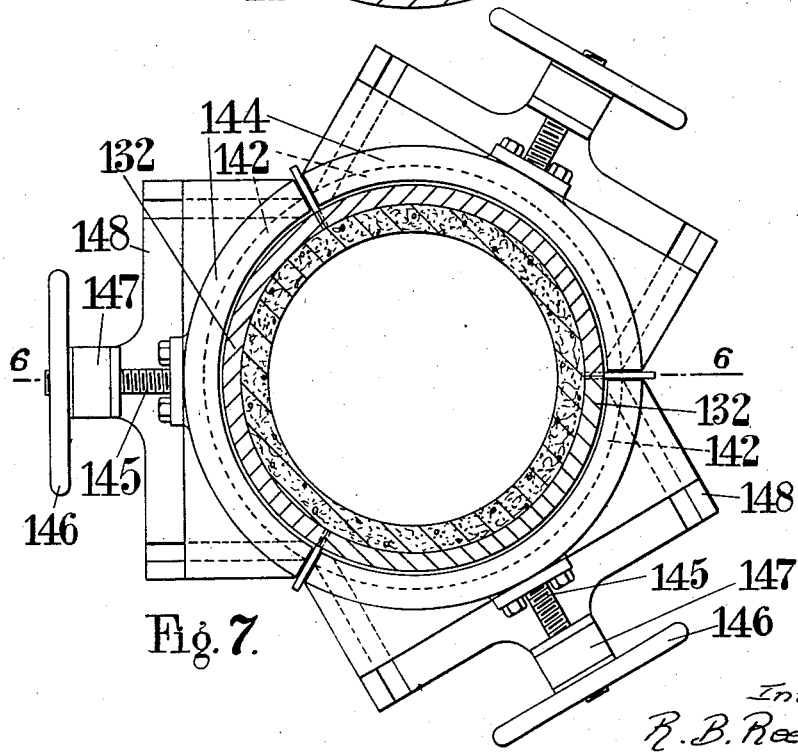
Figure 7 is a transverse section on the line 7—7 of Figure 6.

Referring to Figures 7 and 8, the outer casing comprises a flanged cylindrical body portion 171 to which is bolted an annular upper end portion 172 and a lower annular end portion 173. The outer mold section 131 comprises three segments which abut against the inner margins of the end portions 172 and 173 and are located in their operative position shown in Figure 7 by means of annular ribs 178, 179 and 170, 180, respectively, leaving an annular space 176 between said mold section and the outer casing, into which the segments can be withdrawn to free the pipe by means of adjusting screws 191 and hand-wheels 192 having screw-threaded bores which are threaded on the screws 191. An annular sealing ring 121 is inserted in the upper end portion 172, being secured in position therein by means of dogs 177 bolted to the end portion 172.

The core sleeve 181 is gripped at its lower end between a reduced conical part at the lower end of the tubular core part 137 and a corresponding conical opening in the bottom core part 138, the core parts 137 and 138 being clamped together and to the base 101 by means of a nut 139 screwed on to a threaded extension 140 of the core part 137. At its upper end, the core sleeve 181 is gripped between the reduced tapered end of the core part 137 and a conical cap 122 which is clamped to the core part 137 by means of a screw 123, the inner periphery of the sealing ring being conical and fitting closely around the cap 122.

The lower annular end portion 173 is bolted to an outer bottom mold member 132 for forming the socket of the pipe, said member having a flange 142 which abuts against a corresponding flange 143 on a cylinder 133 which is bolted to the base 101 and accommodates an annular piston 135 encircling the lower end of the bottom core part 138. U-leather packings 136 accommodated in recesses in the lower end of the core part 138 and in the cylinder 133, respectively serve for sealing the piston 135. The flanges 142 and 143 are tapered and are embraced by arcuate clamping members 144, which can be forced inwardly by means of hand-wheels 146 having threaded bores through which pass screw studs 145 bolted to the clamping members 144, said hand-wheels being rotatable in bearings 147 on brackets 148 bolted to the base 101. The piston 135 co-operates with a follower 149 in a similar manner to that of the follower shown in Figure 6, said follower being provided with a number of radially extending internal protuberances 141 for engagement by the piston.

Fluid under pressure is admitted through the pipe 114 which passes upwardly through the interior of the core 137 and is bent radially outwards, passing through the wall of the core so as to deliver the fluid between the core and the sleeve 181. Fluid under pressure is also admitted below the piston 135 through the pipe 112 for applying pressure to the plastic material in the longitudinal direction of the pipe and to the space between the outer casing 176 and the extensible sleeve 214 which surrounds the segments of the outer mold section 131 to press the segments of the mold section together.

When the molding is completed, the nuts which hold down the dogs 177 are slackened and the sealing ring 121 is removed, after which the clamping members 144 are withdrawn from the flanges 142, 143 by rotation of the hand-wheels 146, thereby releasing the outer casing and allowing it to be lifted from the core and the base 101 together with the mold sections and the molded pipe which is subsequently released from the mold section 131 by withdrawing the segments of the mold section into the space 176 of the outer casing by rotation of the hand-wheels 192.

The above embodiments of the invention have been described in detail by way of example only, and it is to be understood that the invention is not restricted to the manufacture of pipes provided with sockets. The apparatus may be modified as required. For example, the mold and core in the constructions shown in Figures 2–5 need not be cylindrical, but may be of any suitable shape, and the mold may be divided into any desired number of sections.

What I claim is:

1. An apparatus for molding hollow articles from or for lining hollow articles with plastic materials, comprising in combination, an outer casing having a mold therein comprising a plurality of longitudinal sections, guide rings on said outer casing for preventing movement of said mold sections relatively to the outer casing in the axial direction, said guide rings permitting movement of the mold sections in the radial direction to enable the mold sections to be detached from the molded article after the molding has been completed, a base for supporting said outer casing and mold during the molding, a core on said base, an extensible covering sleeve surrounding said core and means for admitting fluid under pressure between the core and the covering sleeve.

2. An apparatus for molding hollow articles from or for lining hollow articles with plastic materials, comprising the combination as set forth in claim 1, with an extensible covering sleeve surrounding the mold sections, means for introducing fluid under pressure between the outer casing and said covering sleeve during the molding, screw threaded rods connected to the mold sections and passed through the outer casing, and manual actuating means connected to said screw-threaded rods for retracting the mold sections after relaxation of the fluid pressure between the outer casing and the covering sleeve surrounding the mold.

3. An apparatus for molding hollow articles having a socket or for lining such hollow articles with plastic materials, comprising in combination, a mold having a socket-forming portion, a core comprising a lower part within the socket-forming portion of the mold and an upper part having an extensible covering sleeve surrounding it, a movable mold member surrounding the lower part of the core and arranged to extend into the socket forming portion of the mold, means for admitting fluid under pressure between the core and the covering sleeve so as to compress the plastic material, and means arranged for actuation by fluid under pressure for displacing said movable mold member in the axial direction of the mold to apply axial pressure to the socket of the hollow article during the molding.

4. An apparatus for molding hollow articles or lining hollow articles with plastic materials, comprising in combination, a mold having a socket-forming portion, a core comprising a lower part within said socket-forming portion of the mold and an upper portion having an extensible covering sleeve surrounding it, a movable mold member surrounding the lower part of the core and arranged to extend into the socket-forming portion of the mold, a cylinder having a piston therein arranged to bear against said movable mold member, means for admitting fluid under pressure between the core and the covering sleeve so as to compress the plastic material, and means for admitting fluid under pressure to said cylinder for actuating said piston to displace the movable mold member in the axial direction of the mold to apply axial pressure to the socket of the hollow article during the molding.

5. An apparatus for molding hollow articles or lining hollow articles with plastic materials, comprising in combination, a mold having a socket-forming portion, a core comprising a lower part within said socket-forming portion of the mold and an upper part having an extensible covering sleeve surrounding it, a movable mold member surrounding the lower part of the core and arranged to extend into the socket-forming portion of the mold, an annular piston surrounding the lower part of the core arranged to bear against said movable mold member, a cylinder for housing said piston, means for admitting fluid under pressure between the core and the covering sleeve so as to compress the plastic material, and means for admitting fluid under pressure to said cylinder for actuating said piston to displace the movable mold member in the axial direction of the mold to apply axial pressure to the socket of the hollow article during the molding.

6. An apparatus for molding hollow articles having a socket or for lining such hollow articles with plastic materials, comprising in combination, an outer casing, a mold comprising a plurality of longitudinal sections and a socket-forming portion, said longitudinal sections being housed in said casing, guide rings on said outer casing for preventing movement of said mold sections relatively to the outer casing in the axial direction, said guide rings permitting movement of the mold sections in the radial direction, a base for supporting said outer casing and mold during the molding, a core on said base, an extensible covering sleeve surrounding said core, means for admitting fluid under pressure between the core and the covering sleeve so as to compress the plastic material, flanges on said base and socket-forming portion arranged to abut against one another, and means for releasably securing said flanges together, comprising radially adjustable clamping members capable of releasing the flanges to enable the mold to be withdrawn from the core and base after relaxation of the fluid pressure between the core and the covering sleeve.

7. An apparatus as set forth in claim 6, with means for adjusting the clamping members, comprising bearing supports on the base, screw studs rigid with the arcuate clamping members and manually adjustable members rotatable in said bearing supports and having screw-threaded bores therein for radially adjusting the clamping members.

ROBERT BRUCE REEVES.